United States Patent [19]
Ishaque et al.

[11] Patent Number: 5,241,180
[45] Date of Patent: Aug. 31, 1993

[54] RADIATION DETECTION DEVICES WITH TAPERED SCINTILLATOR CRYSTALS

[75] Inventors: Ahmad N. Ishaque, Clifton Park; Gene C. Hilton, Albany, both of N.Y.

[73] Assignee: General Electric Company, Schenectady, N.Y.

[21] Appl. No.: 925,062

[22] Filed: Aug. 5, 1992

[51] Int. Cl.$^5$ .................. G01T 1/20; G01T 1/202; G01T 1/203
[52] U.S. Cl. ................ 250/361 R; 250/367; 250/368; 250/370.11; 250/483.1
[58] Field of Search ............. 250/361 R, 366, 367, 250/368, 370.09, 370.11, 363.01, 483.1, 484.1 R

[56] References Cited

U.S. PATENT DOCUMENTS

| Re. 25,634 | 9/1964 | Pringle et al. | 250/361 R |
| 2,666,145 | 1/1954 | Eversole et al. | 250/367 |
| 4,291,228 | 9/1981 | Thompson | 250/367 X |
| 4,560,882 | 12/1985 | Barbaric et al. | 250/370.11 |

FOREIGN PATENT DOCUMENTS

61-142872 6/1986 Japan ............................ 250/368

OTHER PUBLICATIONS

Kobayashi et al. "Modulated NaI(Tl) Detector in a Half Barrel Configuration", Nuc. Ins. & Met in Phys. Reas., A245, 1986, pp. 59-70.

*Primary Examiner*—Constantine Hannaher
*Assistant Examiner*—Edward J. Glick
*Attorney, Agent, or Firm*—Donald S. Ingraham; Marvin Snyder

[57] ABSTRACT

A radiation detection device includes a scintillator having an upper scintillator body section and a lower scintillator body section. The upper section forms an arcuate-shaped cap through which the incident radiation enters the scintillator, and the lower section has sidewalls disposed at a selected taper angle with respect to the longitudinal axis of the scintillator body and an optically transmissive window disposed opposite the cap of the upper section such that optical photons can pass from the scintillator to a photodetector coupled to the window. An optically-diffuse reflective layer is disposed over the sidewalls and the cap. The sidewalls typically have a positive taper angle, being closer to one another near the optically transmissive window and farther from one another near the cap. The arcuate shape of the cap typically conforms to the arc of a circle centered on the optically transmissive window. The selected taper angle of the sidewalls and the radius of the arc of the cap are chosen to cause light photons generated within the scintillator body to be reflected from the sidewalls toward the cap and reflected from the cap towards the optically transmissive window (or reflected directly to the optically transmissive window for sidewalls having a negative taper angle) such that the photons are focussed on the window and strike the window at an angle greater than the critical angle for the scintillator-to-photodetector interface.

18 Claims, 1 Drawing Sheet

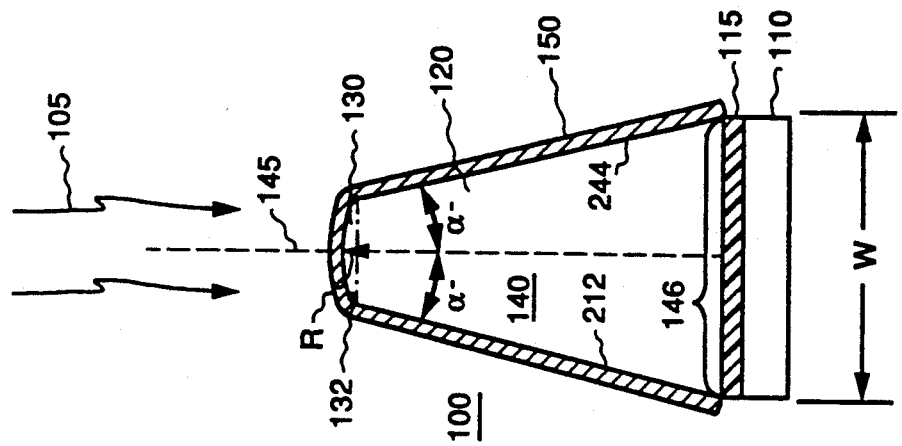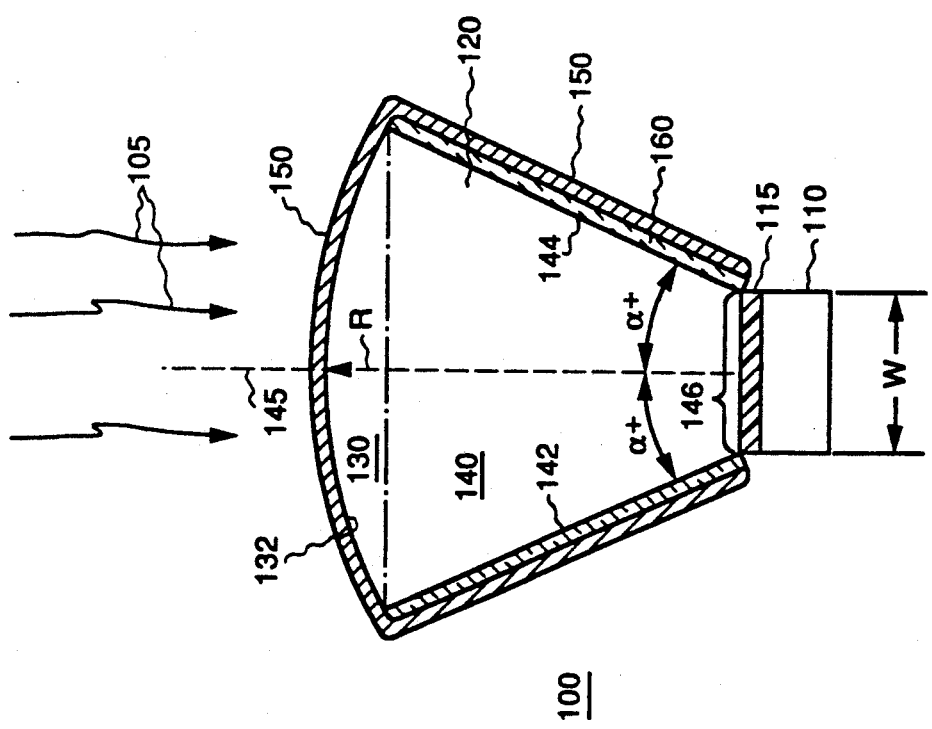

RADIATION DETECTION DEVICES WITH TAPERED SCINTILLATOR CRYSTALS

BACKGROUND OF THE INVENTION

This invention relates generally to radiation imaging systems and more particularly to scintillators coupled to photodetectors for use in such systems.

Scintillators are widely used fluorescent materials which can detect high energy radiation by converting it into optical photons. The absorption of incident X- or gamma-ray photons in the scintillator material produces light (optical) photons, which can in turn be detected by a photodetector, such as a silicon photodiode. Detection of the optical photons generated provides a measure of the intensity and/or the energy of the incident X- or gamma radiation.

Optical photons that are generated by the absorption of X- or gamma rays emanate from the absorption site in the scintillator material in random directions. To accurately measure the flux of incident x- or gamma rays it is necessary to detect as many of the light photons generated in the absorption event as feasible. Thus it is important that the optical signal not be significantly attenuated by loss of optical photons out the sides or top of the scintillator crystal, or by absorption of the optical photons in the scintillator material.

Typically scintillator assemblies include a rectangularly-shaped scintillator crystal coupled to a photodetector. Scintillator crystals commonly have a specular reflective coating disposed over the sidewalls and top of the crystal (that is, the end opposite the one which is coupled to the photodetector). Specular reflection is governed by the classical law of reflection in which the incoming beam of photons is reflected at an angle equal to the angle of incidence with the surface normal. The reflectance of specular reflectors, such as silver, gold, or the like, varies with the angle of incidence of the photons, with reflectance dropping dramatically as angles of incidence approach the normal. Moreover, it has been observed that the theoretical predicted reflectance is not achieved in films deposited on scintillators due to surface nonuniformities in the scintillator material. Additionally, some films commonly used as specular reflectors, e.g., silver, chemically react with the scintillator surface, leading to a degradation of scintillator properties (such as surface reflectance).

The block-like rectangular geometry of prior art scintillator crystals can also exacerbate the problem of total internal reflection (TIR) of light photons at the coupling between the scintillator crystal and the photodetector. In particular, if the coupling layer has a lower refractive index than the scintillator material, a critical angle of incidence ($\phi_c$) exists at the coupling interface. If the photon strikes the interface at an angle greater than the critical angle, the photon undergoes total internal reflection (that is, it is reflected back into the scintillator material) and is not able to pass through to the photodetector. Potential loss due to TIR is increased with specular reflectors and rectangularly-shaped scintillators because trapping modes may be present due to the symmetry of the angle of incidence and the angle of reflection in which the photon is repeatedly reflected back into the scintillator. When the photon is repeatedly reflected back into the scintillator, it is likely that the photon will be absorbed in the scintillator material before it escapes to the photodetector.

In the optical art it is known that diffuse reflective materials can also be used to reflect light. For diffuse reflectors, the angle of reflection is independent of the angle of incidence. According to Lambert's law, the intensity of the reflected beam of photons is proportional to the cosine of the angle with the surface normal, which relationship results in a distribution of reflected photons that is focussed in the direction of the normal to the reflective surface, irrespective of the path of the incident photons, a phenomenon known as forward focussing. Diffuse reflectors, such as powdered polytetrafluoroethylene (Teflon), are available which can be applied to a surface to have a reflectance of greater than 98% at all angles of incidence.

In conventional, rectangularly-shaped scintillator crystals the forward focussing characteristic of diffuse reflectors can prove to be a disadvantage in that photons striking the wall of the scintillator have a greater probability of being reflected at a small angle with respect to the surface normal. As a result, a photon would undergo a larger number of reflections before reaching the transmission window to the photodetector as compared to a rectangular shaped scintillator with specular reflectors on its sides. This higher number of reflections, and consequent longer path in the scintillator material increases the likelihood the photon will be absorbed and the advantage of the improved reflectance is impaired.

It is thus an object of this invention to provide an efficient scintillator having high energy resolution and photon output.

It is a further object of this invention to provide a scintillator having little total internal reflection of photons at the scintillator-photodetector interface.

It is a still further object of the invention to provide a scintillator having diffuse reflective material that is passive with respect to the scintillator material.

It is yet a further object of the invention to provide a scintillator having a shape that focuses photons onto the scintillator-photodetector interface with relatively few reflections within the scintillator material.

SUMMARY OF THE INVENTION

In accordance with this invention a radiation detection device is provided in which the scintillator comprises a crystal having an arcuate-shaped cap forming an upper section through which incident radiation enters the crystal. The lower section of the crystal has sidewalls with a selected taper angle with respect to the longitudinal axis of the scintillator body and terminates in an optically transmissive window through which light photons pass to a photodetector coupled to the scintillator. An optically diffuse reflective layer is disposed over the tapered sidewalls and the cap. The taper angle of the sidewalls and the radius of the arcuate shaped cap are selected to cause optical photons generated within the scintillator material to be focussed onto the optically transmissive window such that the photons are incident on the window at greater than the critical angle for the window.

The arcuate shape of the cap typically conforms to the arc of a circle centered on the optically transmissive window, with the radius of the circle being selected to provide an arc that causes optical photons incident on the interior surface of the cap to be reflected towards the optically transmissive window. The selected taper angle of the sidewalls can be positive, i.e., the distance between the sidewalls is smaller near the optical window than near the cap, or negative, i.e., the distance between the sidewalls is greater near the optical window than near the cap. The selected taper angle of the sidewalls is advantageously between about 45° and about 5°.

The diffuse reflective material disposed over the sidewalls and the cap of the scintillator crystal typically comprises polytetrafluoroethylene powder, magnesium oxide, or the like. In an alternative embodiment, a dielectric protective layer is disposed between the tapered sidewalls and the diffuse reflective material. The scintillator material typically comprises cesium iodide, cadmium tungstate, sodium iodide, a plastic scintillator formed by dissolving an organic scintillator such as anthracene in a suitable solvent such as styrene monomer, which is then polymerized, or the like.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like characters represent like parts throughout the drawings, and in which:

FIG. 1 is a cross-sectional view of a radiation detecting device in accordance with one embodiment of the present invention.

FIG. 2 is a cross-sectional view of a radiation detecting device in accordance with another embodiment of the present invention.

DETAILED DESCRIPTION OF THE INVENTION

In FIG. 1 a radiation detecting device 100 exposed to incident radiation 105, such as X-or gamma rays, comprises a photodetector 110, a scintillator body (scintillator) 120, and a reflective layer 150. Photodetector 110 comprises a photodiode or similar device for generating an electrical signal corresponding to the intensity of optical photons on the photodetector. Photodetector 110 is coupled to scintillator 120 via coupling layer 115 which typically comprises an optically transparent layer such as a polymer or similar material. Although a coupling material would preferably have an optical index of refraction greater than that of the scintillator material, as a practical matter most coupling materials have an index of refraction that is less than that of commonly-used scintillator materials.

Scintillator 120 may be considered to comprise an upper section 130 and a lower section 140, although sections 130 and 140 typically are integrally formed (and are differentiated herein for ease of explanation of the respective geometries of each section). Upper section 130 comprises an arcuate-shaped cap 132 through which incident radiation 105 enters scintillator 120. Lower section 140 of scintillator body 120 is tapered, having sidewalls 142, 144 and an optically transmissive window 146. Sidewalls 142, 144 are tapered with respect to longitudinal axis 145 of scintillator 120. Scintillator 120 comprises a scintillating material such as cesium iodide (CsI), cadmium tungstate ($CdWO_4$), sodium iodide (NaI), or a plastic scintillator, such as is formed by dissolving an organic scintillator such as anthracene in a suitable solvent such as styrene monomer, which is then polymerized (common trade names for plastic scintillators include NE 111, Naton 136, and Pilot F), and the like. The scintillator material is readily mechanically shaped, as described below, and its surfaces polished prior to disposing reflective material around the scintillator body.

In accordance with this invention, the arcuate shape of cap 132 advantageously conforms to the arc of a circle centered on optical transmissive window 146. Radius R of the arc to which cap 132 conforms is selected to cause optical photons incident on the interior surface of cap 132 to be reflected along a path towards optically transmissive window 146 such that the photons strike window 146 at an angle greater than the critical angle for window 146. As used herein, "critical angle" refers to the angle above which an optical photon striking the interface between the scintillator material and coupling layer 115 would undergo total internal reflection (TIR) due to the difference in the optical index of refraction between the two materials. For example, for a scintillator having an optically transmissive window with a width W much smaller than the height of the scintillator (e.g., a width that is about one-tenth or less than the height), the radius of R for the arc of cap 132 is roughly equal to the height of the scintillator.

Further, in accordance with this invention sidewalls 142 and 144 have a positive selected taper angle $a+$ with respect to longitudinal axis 145 of scintillator 120. As used herein, positive taper angle refers to sidewalls disposed with respect longitudinal axis 145 such that the sidewalls are closer together near optically transmissive window 146 and farther apart near cap 132. Selected taper angle $a+$ is typically between about 5° and about 45°. For each scintillator assembly, the optimum value of the selected taper angle is determined by consideration of allowable aspect ratios (length to width), required fraction of incident radiation to be absorbed (in the volume of the scintillator), photon output necessary to generate a useable signal from the photodetector, and similar design considerations.

The tapered sidewalls are well adapted to use with any cross-sectional shape of scintillator body 120. Thus scintillator body 120 may have a circular cross-section (with lower section 140 having the shape of a truncated cone), a rectangular cross-section, or any combination of geometrical shapes. The taper of the sidewalls need not be uniform along their entire lengths.

Reflective layer 150 comprises an optically diffuse reflector such as polytetrafluoroethylene powder (Teflon), magnesium oxide, or the like, and typically has a thickness between about 1 to 2 mils and 1 to 4 millimeters. Reflective layer 150 is typically mechanically applied around scintillator body 120 by methods such as painting, spraying, or packing the reflective material around the scintillator within the confines of an outer support structure (not shown) for the reflective material, and provides a reflective covering that is passive with respect to the scintillator material comprising scintillator 120. In an alternative embodiment, a dielectric protective layer 160 is disposed between sidewalls 142, 144 and optically diffuse reflective layer 150. Dielectric protective layer 160 comprises one or more layers of an optically transmissive dielectric such as cryolite ($Na_3AlF_6$), silicon oxide, silicon nitride or the like. Dielectric protective layer layer 160 typically has a thickness selected based on the predominant wavelength of light generated by the scintillator; for example, for a scintillator of cadmium tungstate, which has a a 540 nm wavelength of maximum emission, a cryolite dielectric layer having a thickness of about 1000 Å (100 nm) provides the desired quarter wave reflection layer and protective layer.

In operation, incident X- or gamma rays 105 enter scintillator 120 through cap 132. As the radiation is absorbed, optical photons are generated and emanate in random directions; some photons will travel directly towards optically transmissive window 146, some will pass towards sidewalls 142, 144, and some will emanate towards cap 132. Light photons striking scintillator sidewalls 142, 144 are reflected in accordance with Lambert's law in a direction towards the normal to the sidewall; thus the photons are reflected towards cap 132, either directly or via intermediate reflections from the opposite sidewall. The number of intermediate reflections off of sidewalls that a photon experiences before reaching cap 132 is a function of the selected taper angle, with a larger angle causing few (if any) intermediate reflections. For example, at a taper angle of about 45°, the photons reflected towards the normal of the surface would travel along more or less a direct path to cap 132. Even slightly tapered sidewalls (e.g., a selected taper angle of about 5° or less) cause the photons to be reflected towards the cap, although the photons undergo more reflections off of respective sidewalls before they strike the cap. Photons incident on the interior surface of cap 132 are again reflected in accordance with Lambert's law towards the normal to the tangent of the curved surface, i.e., along a path corresponding to the radius of the arc of the cap such that the reflected photons are focussed onto optically transmissive window 146. Thus, in accordance with this invention, optical photons generated by the absorption of incident radiation are reflected from the sidewalls and cap to be focussed on the window 146, with each photon undergoing fewer reflections and travelling a shorter total path through the scintillator than a comparable rectangular-shaped scintillator block with specular or diffuse reflective surfaces.

An alternative embodiment of the invention is illustrated in FIG. 2, in which all identification numerals correspond to the identification numerals in FIG. 1. The device illustrated in FIG. 2 is similar in all respects to the device of FIG. 1 described above with the exception that sidewalls 242 and 244 have a selected negative taper angle ($\alpha^-$), i.e., the sidewalls are closer to one another nearer cap 132 and farther from one another nearer optically transmissive window 146. The selected negative taper angle is between about 5° and 45° with respect to the longitudinal axis 145 of scintillator crystal 120, as is illustrated in FIG. 2. Optically diffuse reflective layer 150 extends over sidewalls 242, 244 and cap 132 as discussed above with respect to the device illustrated in FIG. 1. In operation, light photons generated in scintillator crystal 120 that strike sidewalls 244, 244 are reflected towards the normal of those sidewall surfaces, and, due to the selected negative taper angle of the sidewalls, the light photons are reflected towards optically transmissive window 146, through which they pass to photodetector 110. The number of reflections each photon undergoes (off of respective sidewalls of scintillator 120) is primarily a function of the negative taper angle, with fewer reflections being required the closer the negative taper angle is to 45° with respect to longitudinal axis 145 of scintillator 120.

Certain operational considerations in some radiation detecting devices make preferably the use of the geometry of the scintillator having the positive selected taper angle of the sidewalls. For example, the positive taper angle device presents a larger cross-sectional area at upper section 130 where the incident radiation enters the scintillator, thus increasing the number of incident X- or gamma rays that are likely to be absorbed in the scintillator crystal. Further, the positive taper angle geometry reduces the likelihood that a light photon striking optically transmissive window 146 will undergo total internal reflection as the light photons reflected towards the window from cap 132 are less likely to strike the window at an angle greater than the critical angle for the scintillator-to-photodetector coupling interface. Finally, the positive taper angle geometry provides for a smaller optically transmissive window and thus the photodetector coupled to scintillator 120 can be smaller in the device with the positive taper angle than in the device with the negative taper angle for detection of the same (or even a greater) number of incident X- or gamma rays. The smaller photodetectors present advantages with regard to capacitance, noise performance, economical assembly, and operation. In other applications, in which some loss of X- or gamma radiation can be tolerated and in which total internal reflection is not a problem, the device having sidewalls with a negative taper angle can be more advantageous.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A device for detecting incident radiation comprising:
    a photodetector;
    a scintillator body coupled to said photodetector wherein an upper section includes an arcuate-shaped cap through which incident radiation enters said scintillator body, and a lower section includes sidewalls disposed at a selected taper angle with respect to the longitudinal axis of said scintillator body and terminate in an optically transmissive window adjacent to said photodetector; and
    an optically diffuse reflective layer disposed over the lower section sidewalls and said cap;
    the radius of said arcuate-shaped cap being selected such that light photons striking said cap from within said scintillator body predominantly reflect towards said optically transmissive window.

2. The device of claim 1 wherein the arcuate-shape of said cap conforms to an arc of a circle centered on said optically transmissive window.

3. The device of claim 2 wherein the radius of said arcuate-shaped cap is selected to cause substantially all light photons reflected from said cap towards said optically transmissive window to strike said window at an angle greater than the critical angle for said window.

4. The device of claim 3 wherein said selected taper angle of said lower section sidewalls is positive such that said sidewalls are disposed closer to one another nearer said optical transmissive window and farther from one another nearer said cap whereby light photons striking said sidewalls and the overlying diffuse reflective layer are predominantly reflected towards said cap.

5. The device of claim 4 wherein the positive selected taper angle is between about 5° and about 45°.

6. The device of claim 3 wherein said selected taper angle of said lower section sidewalls is negative such that said sidewalls are disposed farther from one another nearer said optical transmissive window and closer to one another nearer said cap whereby light photons striking said sidewalls and adjacent diffuse reflective layer are predominantly reflected towards said optically transmissive window.

7. The device of claim 6 wherein the negative selected taper angle is between about 5° and about 45°.

8. The device of claim 5 wherein said optically diffuse reflective layer is selected from the group comprising polytetrafluoroethylene powder and magnesium oxide.

9. The device of claim 8 further comprising a dielectric reflector disposed between said lower section sidewalls and said optically diffuse reflective layer.

10. The device of claim 6 wherein said optically diffuse reflective layer is selected from the group comprising polytetrafluoroethylene powder and magnesium oxide.

11. The device of claim 10 further comprising a dielectric protective layer disposed between said lower section sidewalls and said optically diffuse reflective layer.

12. A scintillator assembly comprising:
a scintillator body wherein an upper section has a first selected geometry including an arcuate-shaped cap through which incident radiation enters said scintillator body, and wherein a lower section has a second selected geometry including sidewalls disposed at a selected taper angle with respect to the longitudinal axis of said scintillator body and terminating in an optically transmissive window disposed opposite said cap; and
an optically diffuse reflective layer disposed over the lower section sidewalls and said cap;
the radius of said arcuate shaped cap being selected such that light photons striking said cap from within said scintillator body are reflected towards said optically transmissive window.

13. The device of 12 wherein the arcuate-shape of said cap conforms to the arc of a circle centered on said optically transmissive window.

14. The device of claim 12 wherein said selected taper angle of said lower section sidewalls is positive such that said sidewalls are disposed closer to one another near said optically transmissive window and farther from one another near said cap whereby light photons striking said sidewalls and the overlying diffuse reflective layer are predominantly reflected towards said cap.

15. The device of claim 14 wherein the positive selected taper angle is between about 5° and about 45°.

16. The device of claim 12 wherein said selected taper angle of said lower section sidewalls is negative such that said sidewalls are disposed farther from one another near said optically transmissive window and closer to one another nearer said cap whereby light photons striking said sidewalls and adjacent diffuse reflective layer are predominantly reflected towards said optically transmissive window.

17. The device of claim 16 wherein the negative selected taper angle is between about 5° and about 45°.

18. The device of claim 12 wherein said scintillator body comprises a material selected from the group comprising cesium iodide, cadmium tungstate, sodium iodide, and a plastic scintillator.

* * * * *